United States Patent Office 3,374,207
Patented Mar. 19, 1968

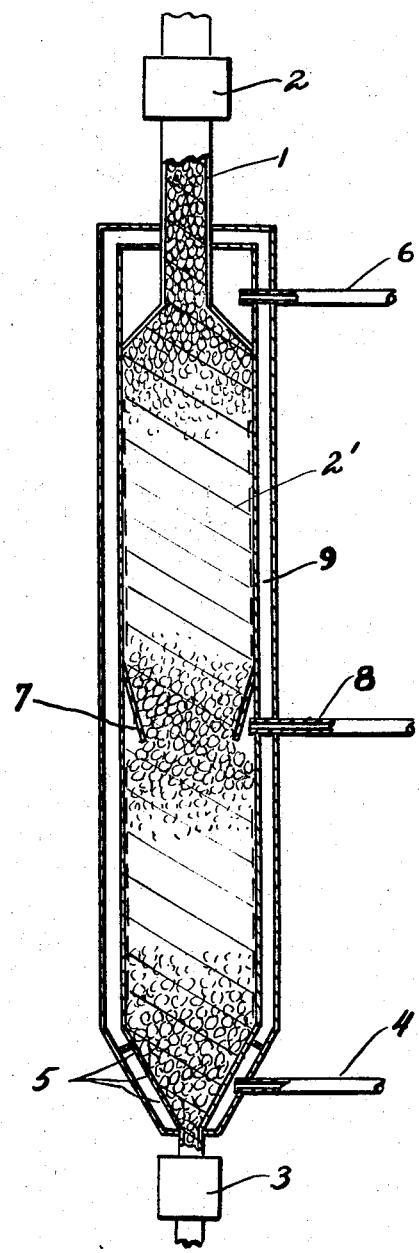

3,374,207
CONTINUOUS PROCESS FOR THE EXTRACTION OF MONOMERS AND OLIGOMERS FROM HIGHLY POLYMERIZED CAPROLACTAM GRANULES
Kaspar Ryffel and Walter Zehnder, Ems, Switzerland, assignors to Inventa A.G. für Forschung und Patentverwertung, Zurich, Switzerland
Continuation-in-part of application Ser. No. 859,528, Dec. 14, 1959. This application Nov. 12, 1964, Ser. No. 412,282
5 Claims. (Cl. 260—78)

ABSTRACT OF THE DISCLOSURE

A process for the extraction of monomers and oligomers from highly polymerized poly-E-caprolactam granules and recovery for re-use. The granulated polymer containing the monomers and oligomers is caused to slide through a vertical tube and is contacted by an extractant in countercurrent.

---

This application is a continuation-in-part of our copending application Ser. No. 859,528, filed Dec. 14, 1959, and now abandoned.

The invention relates to a process of refining of granulated polyamides and, more particularly, to the removal of constituents of low molecular weight therefrom. It is especially applicable to poly-E-caprolactam, known as nylon-6.

Poly-E-caprolactam is a highly polymerized material, as is generally known. However, constituents of low molecular weight initially are present therein which adversely affect the physical and mechanical properties of the nylon-6, which is used for molding, extrusion, and particularly for the formation of synthetic fibers. The latter use is of especial interest in connection with the present invention, and its preferred use therefore is directed to fiber-forming poly-E-caprolactam albeit the use for molding resins is not to be considered excluded. The fiber-forming grade notoriously has the highest degree of polymerization.

The "constituents of low molecular weight" mentioned are monomeric and oligomeric caprolactam, and the oligomer substantially is the dimer and the timer of caprolactam, usually in mixture. Their removal from highly polymerized nylon-6 has met with difficulties in the past.

Before the granulated poly-E-caprolactam is fabricated by injection molding or, in the case of fiber-formers, in spinnerets, these granulates therefore must be subjected to a washing process to free them from the monomer and oligomers. This frequently is accomplished by a water wash, as for instance, by the so-called "chip-washing" as described in Swiss Patent 230,271, and usually carried out by the so-called "layer process." This process suffers from the drawback that the concentration of the monomer and oligomer in the wash water is very low so that their recovery becomes very costly. The layer process has the additonal disadvantage of non-uniformity of the residual content of monomers and oligomers in the nylon-6 thus treated.

Washing in boiling water, as taught in U.S. Patent 2,978,439, leads to a discoloration of the high-polymer thus treated, so that reducing agents, e.g., hydrogen sulfite, sulfur dioxide and/or hydrazine hydrate must be incorporated in the wash water which may lead to contamination, and even these additions do not preclude the discoloration, i.e., yellowing, without fail. In this highly competitive nylon market, a yellowed product is unsalable, besides it is an indication of oxidation. The employment of boiling water or steam, the latter disclosed in U.S. 2,867,805, causes degradation and also yellowing of the poly-E-caprolactam.

It now has been found that granulated high-polymeric poly-E-caprolactam can continuously be freed from its monomeric and oligomeric constituents by causing the granules to slide through a vertical tube in countercurrent to a suitable solvent. Simultaneously, the monomers and oligomers can be concentrated in the solution obtained and can be re-used for further polymerization in that solution or after recovery therefrom.

The process according to the invention is applicable particularly to fiber forming nylon-6 and will be described in detail with reference to the accompanying drawing, which is an elevation of the extraction device.

Through a vertical tube 1 granulate 2' is poured into the treatment chamber through a feed device 2. Extracting agent is pumped from below into the extraction chamber through pipe 4 and the annular passage 5 and is drawn off through the pipe 6 after absorbing the constituents of low molecular weight. The granulate is removed from the extraction chamber through a discharge device 3. Because the granulate is made to slide through the extraction column as a compact layer, it is possible to adjust the time of sojourn and thereby the degree of extraction as desired. If, in addition to obtaining as complete an extraction of the low molecular weight constituents as possible, it is desired to obtain the aqueous solution thereof as concentrated as possible at the same time, it is preferred, according to a further feature of the process according to the invention, to cause the quantity of extracting agent which flows through the column per unit of time at certain heights or levels to be reduced from the bottom upwards. In order to achieve this, extracting agent is drawn off the column at various heights. One of these removal points 7 is shown in the drawing. Part of the extracting agent fed through pipe 4 thus is drawn off at this point through the pipe 8. Of course, care must be taken that the extracting agent covers the entire layer of granulate right to the very top of the extraction chamber. This can be done, for example, by maintaining the correct ratio of the fed quantity of extracting agent to that removed at the intermediate points of removal, i.e., care must be taken that the quantity supplied is always larger than the quantity removed at the intermediate points of removal. Owing to the fact that the quantity of extracting agent which flows from the bottom upwards per unit of time through the extraction chamber and thereby through the granulate decreases, it is possible both to enrich the extract content in the extracting agent in the upper part of the column and to extract from the granulate with the large quantities of extracting agent in the lower part of the column the constituents of low molecular weight, which are present only in small quantity at this point.

The extraction may also be carried out at elevated temperatures. The extracting agent then is preheated and the apparatus is heated by a heating medium, circulating in heating jacket 9. If the extraction is to be carried out at temperatures above the boiling point of the extracting agent, this must be done under pressure. In this case, the granulate must be introduced through a pressure lock.

In order to make the extracting action as efficient as possible, it is advantageous to take care that the extracting agent either has the same temperature over the entire height of the column or a temperature increasing from bottom to top thereof. It is also advantageous to keep the ratio of tube diameter to tube length, at least 1:5, preferably at about 1:40. By means of these measures, any harmful cross-currents which may be produced because of differences of temperatures and differences of density of the extracting agent can practically be eliminated. The ratio of tube length to tube diameter also should not be too large, i.e., it should not exceed 100:1.

It is clear that the optimum time of sojourn of the granulate is dependent upon the solubility of the low molecular components in the solvent, on the extraction temperature and also on the velocity of diffusion of the extracted substances from the polyamide and thereby, naturally, also on the grain size of the granulate.

The process will now be further described by the following examples. However, it should be understood that these are given merely by way of explanation, not of limitation, and that numerous changes may be made in the details without departing from the spirit and the scope of the invention as hereinafter claimed.

Example 1 illustrated the operation of an extraction process in which the quantity of extracting agent is not reduced from the bottom upwards. In this way, lactam solutions of low concentration are obtained. Example 2 shows the extraction in which some of the solvent is drawn off the column.

For reasons of economy, water preferably is employed as the extracting agent, but all solvents which dissolve the low molecular weight constituents without harming the polymer may be used, such, as for example, low monoalcohols. Water must not be at boiling temperature unless under pressure. At atmospheric pressure, the maximum temperature is 95° C. A range of substantially 90–95° C. is preferred although lower temperatures may be employed.

Example 1

Poly-E-caprolactam granulate in the form of chips 2.5 mm. in diameter and 2.5 mm. thick is extracted in countercurrent flow with water at 95° C. in an extraction column of 4 meters length and 150 mm. diameter. The rate of discharge is 6 kg./h. of chips calculated on the dry weight, which corresponds to a time of sojourn of about 7½ hours. In the process, the content of extractable constituents decreases from 10.2 to 1.3 percent by weight. Pure water is fed into the bottom of the column from a leveling vessel and 9.3 l./h. lactam solution with a content of 6.2% of extract are drawn off at the top of the column by means of a dosing pump.

Example 2

Poly-E-caprolactam chips having a grain size of 2.5 mm. are extracted with water at 95° C. in an extraction apparatus of 8 meters length comprising six parallel tubes of 150 mm. diameter. The column is provided with an intermediate tapping point for lactam solution at a height of 2 meters from the bottom end. A total quantity of 22 kg./h. of chips (calculated on the dry state) is drawn off in equal amounts at the bottom from all six tubes. In the process, the content of extractable constituents is lowered from 10.5 to 0.5%. Pure water is fed into the bottom of the column from a leveling vessel, and a total quantity of 9 l./h. of a 22% lactam solution are drawn off at the top of the column in equal quantities from each tube by means of a six-part pump. Through the intermediate tapping, a quantity of 16 l./h. of a 2.2% solution is likewise drawn off by means of a six-part pump. The lactam solution contains caprolactam in monomeric and oligomeric form.

In both examples water-white poly-E-caprolactam was recovered which had not in the least discolored.

We claim as our invention:

1. A continuous process for the removal of monomeric and oligomeric caprolactam from granulated highly polymerized poly-E-caprolactam including fiber-forming grades while preventing its yellowing and for the concentration and recovery of said caprolactam, which comprises countercurrently washing a compact layer of said granules, having an average grain size of substantially 2.5 mm., with a liquid which is a solvent for said caprolactam but a non-solvent for the polymer, in an extract or consisting essentially of a vertical cylindrical tube having a ratio of inside diameter to height of at least 1:5 and having a plurality of solvent outlets at varying heights, the topmost outlet being disposed near the top of said extractor; said washing being carried out by continuously feeding substantially 6 to 22 kg./h. of said granules into said extractor from the top and allowing the compact layer formed to slide downward while continuously feeding solvent into said extractor at its bottom and allowing it to travel upward; continuously drawing off portions of said solvent, now containing monomeric and oligomeric caprolactam, at said varying heights, but at all times fully covering said compact layer with solvent, in total amounts of substantially 9 to 25 l./h. and containing said caprolactam in quantities up to 22 percent; continuously drawing off washed granules at the bottom of said extractor; and recovering the monomers and oligomers from their solution.

2. A continuous process for the removal of monomeric and oligomeric caprolactam from granulated highly polymerized poly-E-caprolactam including fiber-forming grades while preventing its yellowing and for the concentration and recovery of said caprolactam, which comprises countercurrently washing a compact layer of said granules, having an average grain size of substantially 2.5 mm., with a liquid which is a solvent for said caprolactam but a non-solvent for the polymer, in an extract or consisting essentially of a vertical cylindrical tube having a ratio of inside diameter to height of 1:5 to 1:40 and a ratio of height to inside diameter not exceeding 1:100, said extractor having a plurality of solvent outlets at varying heights, the topmost outlet being disposed near the top of said extractor; said washing being carried out by continuously feeding substantially 6 to 22 kg./h. of said granules into the top of said extractor and allowing the compact layer formed to slide downward while continuously feeding solvent into said extractor at its bottom and allowing it to travel upward; continuously drawing off portions of said solvent, now containing monomeric and oligomeric caprolactam, at said varying heights but at all times fully covering said compact layer with said solvent, in total amounts of substantially 9 to 25 l./h. and containing said caprolactam in quantities up to 22 percent; continuously drawing off washed granules at the bottom of said extractor; and recovering the monomers and oligomers from their solution.

3. The process as defined in claim 2, wherein said counter-current extraction is carried out in an extractor consisting of a plurality of parallel vertical cylindrical tubes.

4. A continuous process for the removal of monomeric and oligomeric caprolactam from granulated highly polymerized poly-E-caprolactam including fiber-forming grades while preventing its yellowing and for the concentration and recovery of said caprolactam, which comprises countercurrently washing a compact layer of the granules, having an average grain size of 2.5 mm. with water below its boiling point in an extractor consisting essentially of a vertical cylindrical tube having a ratio of inside diameter to height of at least 1:5 and having a plurality of water outlets at varying heights, the topmost outlet being disposed near the top of said extractor; said washing being carried out by continuously feeding substantially 6 to 22 kg./h. of said granules in the extractor at its top and allowing the compact layer formed to slide downward while continuously feeding hot water into said extractor from its bottom and allowing it to travel upward; continuously withdrawing portions of said water, now containing monomeric and oligomeric caprolactam, at said varying heights but at all times fully covering said compact layer with water, in total amounts of substantially 9 to 25 l./h. and containing said caprolactam in quantities up to 22 percent; continuously drawing off washed granules at the bottom of said extractor; and recovering the monomers and oligomers from their aqueous solution.

5. A continuous process for the removal of monomeric and oligomeric caprolactam from granules of highly polymerized poly-E-caprolactam including fiber-forming grades while preventing its yellowing and for the concentration and recovery of said caprolactam, which comprises washing a compact layer of the granules, having an average grain size of substantially 2.5 mm., with water of substantially 90–95° C. at atmospheric pressure in an extractor consisting essentially of a vertical cylindrical tube provided with heating means and having a ratio of inside diameter to height of 1:5 to 1:40 and a ratio of height to inside diameter not exceeding 100:1; said extractor having a plurality of outlets at varying heights, the topmost outlet being disposed near the top of said extractor; said washing being carried out by continuously feeding substantially 6 to 22 kg./h. of said granules into the extractor from the top and allowing the compact layer formed to slide downward while continuously feeding water at said temperatures into the bottom of said extractor and allowing it to travel upwards while maintaining said temperatures; continuously withdrawing water, now containing dissolved monomeric and oligomeric caprolactam, at said varying heights but at all times fully covering said compact layer with water, in total amounts of substantially 9 to 25 l./h. and containing said caprolactam in quantities up to 22 percent; continuously drawing off washed granules at the bottom of said extractor; and recovering the monomers and oligomers from their solution.

References Cited

UNITED STATES PATENTS

| | | | |
|---|---|---|---|
| 2,978,439 | 4/1961 | Kersting | 260—78 |
| 3,015,651 | 1/1962 | Kjellmark | 260—78 |
| 3,047,565 | 7/1962 | Braun et al. | 260—78 |
| 3,149,095 | 9/1964 | Gerutli | 260—78 |
| 3,245,964 | 4/1966 | Wiemer et al. | 260—78 |

WILLIAM H. SHORT, *Primary Examiner.*

H. D. ANDERSON, *Assistant Examiner.*